(12) United States Patent
Iddings

(10) Patent No.: US 10,521,884 B2
(45) Date of Patent: Dec. 31, 2019

(54) METHOD FOR PROMOTING AND DOCUMENTING CUSTOMER ENGAGEMENT USING AN ONLINE PHOTO-SHARING PLATFORM

(71) Applicant: Drew Evans Iddings, Annapolis, MD (US)

(72) Inventor: Drew Evans Iddings, Annapolis, MD (US)

( * ) Notice: Subject to any disclaimer, the term of this patent is extended or adjusted under 35 U.S.C. 154(b) by 0 days.

(21) Appl. No.: 16/197,661

(22) Filed: Nov. 21, 2018

(65) Prior Publication Data
US 2019/0087938 A1 Mar. 21, 2019

Related U.S. Application Data

(63) Continuation-in-part of application No. 15/680,972, filed on Aug. 18, 2017, now abandoned.

(60) Provisional application No. 62/376,743, filed on Aug. 18, 2016.

(51) Int. Cl.
*G06T 3/40* (2006.01)
*G06Q 30/02* (2012.01)
*G06F 16/438* (2019.01)
*G06Q 50/00* (2012.01)

(52) U.S. Cl.
CPC ........ *G06T 3/4038* (2013.01); *G06F 16/4393* (2019.01); *G06Q 30/0261* (2013.01); *G06Q 30/0269* (2013.01); *G06Q 50/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,362,919 B2* | 4/2008 | Das | ........................ | G06F 16/54 |
| | | | | 382/284 |
| 7,970,240 B1* | 6/2011 | Chao | .................. | G06F 3/04817 |
| | | | | 382/305 |
| 8,554,020 B2* | 10/2013 | Berger | .................... | G06T 11/60 |
| | | | | 382/305 |
| 8,620,021 B2* | 12/2013 | Knudson | ................ | G06Q 30/00 |
| | | | | 382/100 |
| 2012/0265758 A1* | 10/2012 | Han | ...................... | G06Q 50/10 |
| | | | | 707/737 |
| 2014/0149863 A1* | 5/2014 | Kondziela | ................. | G06F 8/38 |
| | | | | 715/716 |

(Continued)

*Primary Examiner* — Tsung Yin Tsai

(57) ABSTRACT

A method for promoting and documenting customer engagement using an online photo-sharing platform adds value to both customers and business owners. The method enables multiple customers to submit visual content that is related to products and services which are offered by the business owner. The method sorts through the visual content which has been submitted and uses this visual content to form an interactive mosaic. The interactive mosaic is an image that tessellates the customer's visual content into an image that was selected by the business owner. Additionally, the business owner can make create multiple templates which are used to form mosaics for various products or services. All of the interactive mosaics are hosted on a remote server so that anyone with a computing device may view and copy the photos which are contained therein. Alternatively, the method can also generate and output a static mosaic as a physical manifestation.

7 Claims, 9 Drawing Sheets

(56) References Cited

U.S. PATENT DOCUMENTS

2014/0193047 A1\* 7/2014 Grosz ................... G06F 3/1242
                                                                382/118
2016/0055532 A1\* 2/2016 Connolly ........... G06Q 30/0257
                                                                705/14.55

\* cited by examiner

METHOD FOR PROMOTING AND DOCUMENTING CUSTOMER ENGAGEMENT USING AN ONLINE PHOTO-SHARING PLATFORM

The current application claims a priority to the U.S. Provisional Patent application Ser. No. 62/376,734 filed on Aug. 18, 2016.

FIELD OF THE INVENTION

The present invention relates generally to a computer implemented method helping companies drive revenue from and strengthen their brand relationships with their most preferred consumers. In particular, the present invention utilizes a mosaic image that includes photos submitted by the users to promote brands, as well as, the consumers and fans' affiliation with those brands.

BACKGROUND OF THE INVENTION

There are many photo-sharing services that enable users to share visual content. These services often let users tag shared photos and videos in various quantifiable ways. For example, if enough users tag their photos with a specific event title it is possible to identify a trending topic that can be searched for and analyzed. While this data can be useful to business owners and service providers, the raw user data is often controlled by the photo-sharing service provider. Frequently, these photo-sharing services charge business owners to access the data and do not provide the data in a format that is readily usable for analytics or data mining. Additionally, because these photo-sharing services are generally neutral social networks, they do not encourage customers to engage with a specific brand or service provider. This further limits the value that a business owner can gain by launching a marketing campaign through the photo-sharing service.

The present invention, the method for promoting and documenting customer engagement using an online photo-sharing platform, is a tool that enables business owners and service providers to gather customer data while promoting brand loyalty. The present invention is a photo-sharing tool that enables customers to send photos and videos directly to business owners and service providers. Additionally, the present invention creates an incentive for customers by using customer photos and videos to form an interactive mosaic that can be shared with friends. The present invention incorporates the customer photos and videos into a mosaic that is displayed on a web app. Thus, incentivizing customers to not only send in photos but to also visit the business owner's website and browse available products or services. While customers are prompted to send photos and videos, business owners are able to view and analyze the personal data of each customer. This enables business owners and service providers to gain valuable data about customer engagement.

DETAIL DESCRIPTIONS OF THE INVENTION

Figure 1:
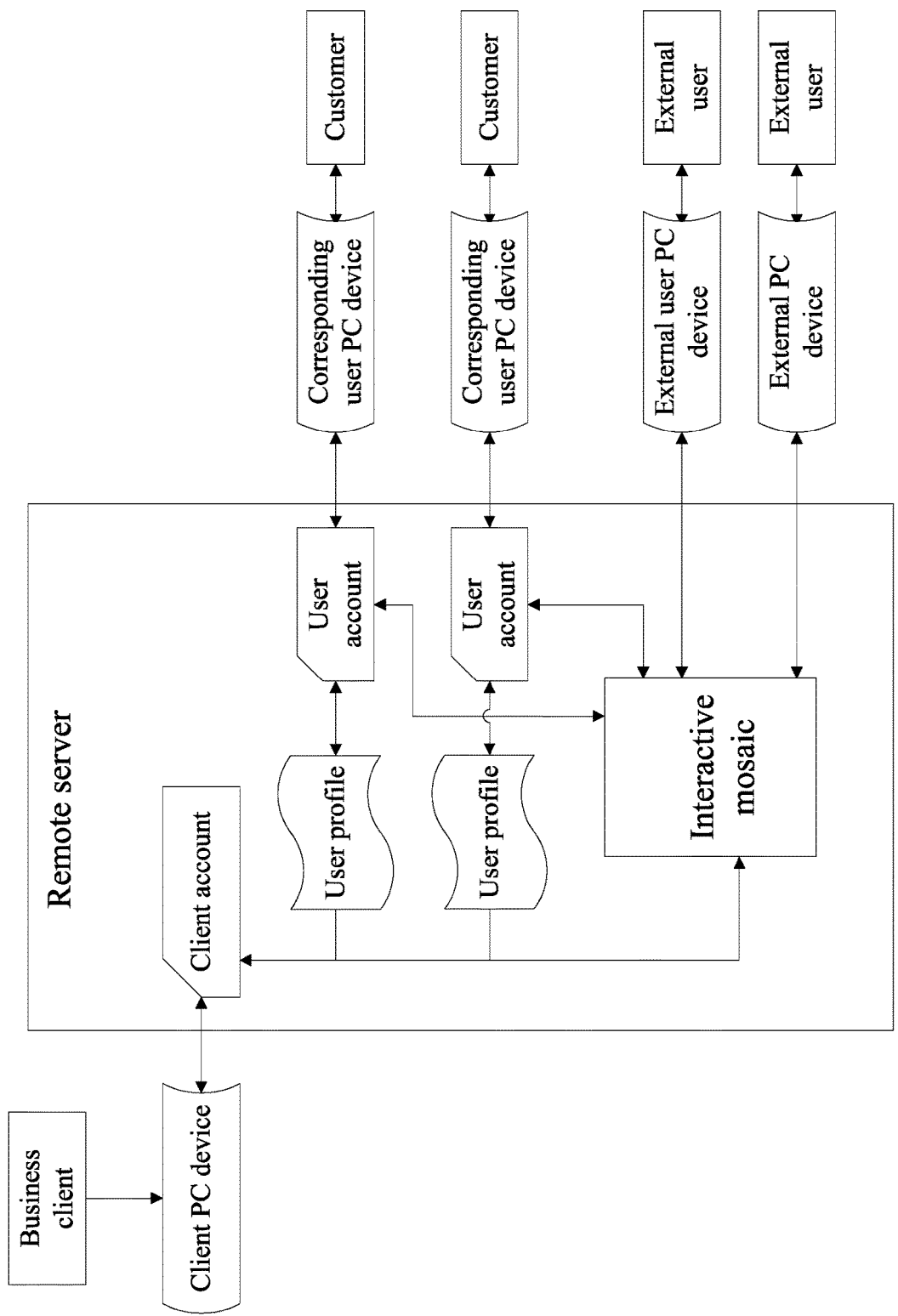
FIG. 1 is a block diagram illustrating the system overview of the present invention.

All illustrations of the drawings are for the purpose of describing selected versions of the present invention and are not intended to limit the scope of the present invention.

As can be seen in FIG. 1 through FIG. 9, the present invention, the method for promoting and documenting customer engagement using an online photo-sharing platform, is a dual-purpose tool used that can be deployed to add value to both businesses and their customers. The first major use of the method of the present invention is to generate an interactive mosaic of customer photos that can be viewed and shared through various types of online interfaces including, but not limited to, websites, web portals, web applications (apps), and mobile apps. The interactive mosaic is formed by encouraging customers to submit photos and videos of themselves while using products or services that are provided by a business client. The term "business client" can refer to, but is not limited to, companies, sports teams, universities, entertainment properties, celebrities, non-profits, and political campaigns. The term "product or services," henceforth referred to simply as a product, is used herein to describe anything that can be offered by a business client. For example, concerts, phones, television shows, clothing, food, and the like are all meant to fall under the grouping defined by the term "product". Recipients of a product, henceforth referred to simply as a customer or customers, can be, but is not limited to, engaged consumers, fans, donors, and voters. These customers are self-selecting to share their brand advocacy and as a "reward" are collectively highlighted in the interactive mosaic.

The second major use of the method of the present invention is to generate searchable databases that contain information about customer engagement. The business client is able to mine the demographic data that is associated with all of the customers who submit photos and videos; thus, identifying trends and gauging customer engagement with particular products. The system used to execute the method of the present invention enables business clients, their customers, and various external users to access the data that is acquired when the customers submit photos. The type of access to the data, however, is dependent on the individual who is viewing the data. Specifically, the business client will be able to access the photos, videos, and personal information for each of their customers. Each customer will only be able to see their own personal information but will have access to the photos and videos of other customers as long as the business client makes these photos and videos available. All other external users will be restricted to accessing whatever photos and videos the business client makes available.

The third major use of the method of the present invention is to generate a static mosaic of customer photos that can be printed onto a physical object, such as a product package, a shirt, a mug, or a banner so that the business client is able to use the physical object as a product for sale at retail or marketing tool for their customers. The promotional benefits associated to the interactive mosaic also apply to the static mosaic for the business client.

Figure 2:
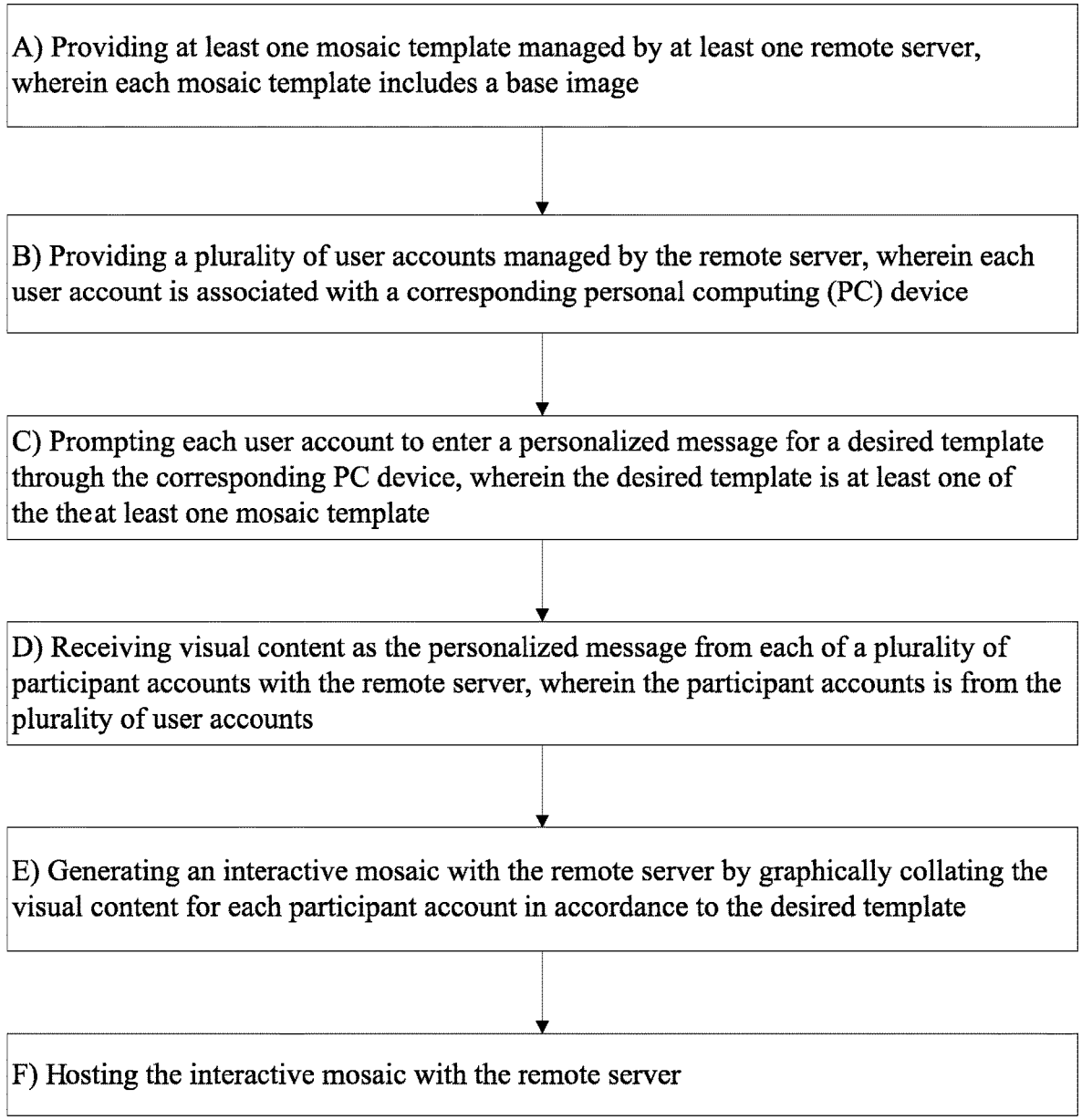
FIG. 2 is a flowchart describing the overall process followed by the method of the present invention.

As can be seen in FIGS. 1 and 2, to accomplish the above-described functionality, the system used to execute the method of the present invention begins by providing at least one mosaic template which are managed by at least one remote server (Step A). Each mosaic template is a formatting tool that is used to organize the photos and videos that are submitted by multiple customers. Specifically, each mosaic template is associated with a corresponding product that the business client offers. Additionally, each mosaic template includes a base image. The base image is a picture that the business client wants to be made into a mosaic of customer photos and videos. Accordingly, the business client choses an image that represents the corresponding product for the mosaic template. This image is then turned into a mosaic that comprises the photos and videos which have been submitted by multiple customers who have used, or are benefitting from, the corresponding product. Continuing on, the system used to execute the method of the present invention further provides a plurality of user accounts, each of which is managed by the remote server (Step B). Each user account is tied to a unique customer and each user account is associated with a corresponding personal computing (PC) device. The corresponding PC devices used to interact with the present invention can be, but is not limited to, a smartphone, a laptop, a desktop, or a tablet PC. The remote server is used to facilitate transferring data between the plurality of user accounts, the business client, and any number of external users. Moreover, the remote server is used to execute a number of internal processes for the present invention and is used to store user information, as well as, template, photo, and video data.

As can be seen in FIG. 2, now that the system used to execute the method of the present invention has been described, it is possible to adequately describe the steps that are executed for the method. The overall method of the present invention begins by prompting each user account to enter a personalized message for a desired template through the corresponding PC device (Step C). The personalized message is a message that the customer sends which includes photo or video content. The desired template is at least one of the at least one mosaic template. Specifically, each customer is given the option to select a specific product that the business client offers and then upload a photo or video of themselves while using or engaging with the product. Furthermore, the business client may offer multiple products and the customer is given the option to upload photos and videos related to any of the offered products by selecting the corresponding mosaic template. Embodiments of the present invention are designed with a plurality of mosaic templates managed by the remote server. In these embodiments the desired template is one of the plurality of mosaic templates. The method of the present invention is designed to function as a tool that can be integrated into various networked systems including, but not limited to, websites and native apps. As such, the business client is able to choose the communication mechanism through which each user account is able to receive prompts, send responses, and access uploaded content. The overall method of the present invention continues by receiving visual content as the personalized message from each of a plurality of participant accounts with the remote server (Step D). The visual content is the photo or video that the customer sends via the personal message. The plurality of participant accounts refers to the group of customers who decide to submit photos or videos that are related to a specific product which is offered by the business client.

As can be seen in FIG. 2, once multiple personalized messages have been received by the remote server, the overall method of the present invention is used to make a mosaic of the photo and video content that is associated with the group of received personalized messages. Specifically, the overall method of the present invention continues by generating an interactive mosaic with the remote server by graphically collating the visual content for each participant account in accordance to the desired template (Step E). The interactive mosaic is a graphical interface that contains the photos and videos that have been submitted by customers. These photos and videos are formatted and arranged to form a mosaiced version of the base image that was supplied by the business client. The interactive mosaic is designed to enable users to search for, enlarge, and highlight specific photos and videos that are positioned within the interactive mosaic. To facilitate this, the overall method of the present invention continues by hosting the interactive mosaic with the remote server (Step F). Once the interactive mosaic has been generated, the method of the present invention is used to make the interactive mosaic available to the business client, customers, an any number of external users. This is accomplished by hosting the interactive mosaic on the remote server so that external users are able to access the interactive mosaic through various PC devices. For example, a customer may visit the business client's website and browse the photos and videos that are integrated into the interactive mosaic through the corresponding PC device. Similarly, the business client may view and manipulate the customer data that is associated with the interactive mosaic using a PC device. Likewise, any number of external users may browse the photos and videos that are integrated into the interactive mosaic by using a dedicated mobile app.

Figure 3:
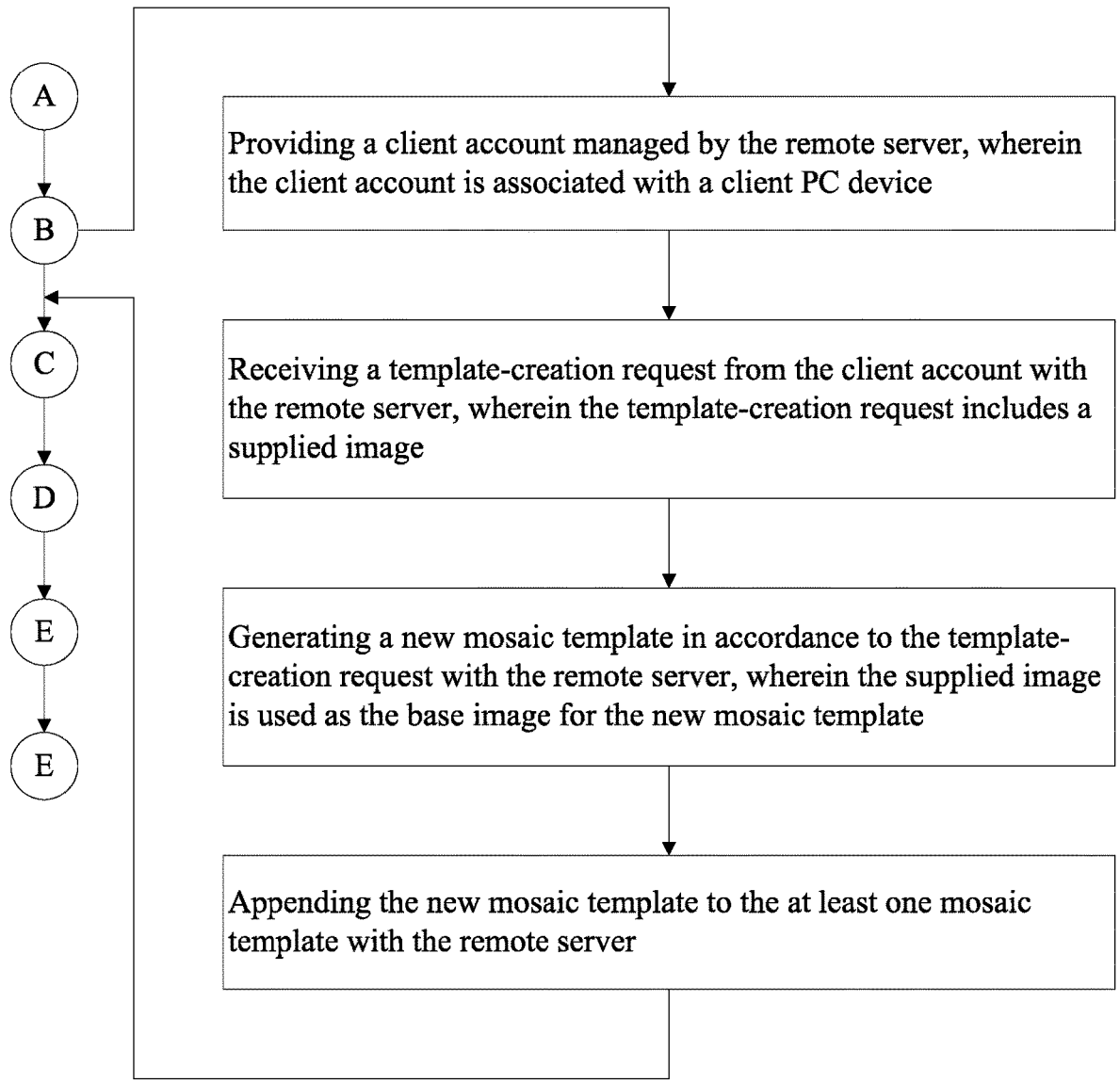
FIG. 3 is a flowchart describing a process for creating a new mosaic template through the method of the present invention.

As can be seen in FIG. 3, the method of the present invention is designed with a sub-process that enables the business client to create mosaic templates for new products. To accomplish this, the system used to execute the method of the present invention provides a client account that is managed by the remote server. The client account is a unique account that the business client uses to interact with the method of the present invention. Additionally, the client account is associated with a client PC device, which is any computing device that the business client happens to be using to interact with the method of the present invention. The sub-process begins by receiving a template-creation request from the client account with the remote server. The template-creation request is a command that the business client sends which directs the remote server to include a supplied image in the template of a new mosaic. The supplied image is any image that the business client would like to be associated with a new product. The supplied image can include, but is not limited to, company logos, photos of actors, or images of the product. Additionally, the template-creation request includes the business client's instructions that dictate how various aspects of the interactive mosaic will be structured. For example, the template-creation request could include instructions that dictate how many pictures or videos should be included in the interactive mosaic. Similarly, the template-creation request could include instructions that dictate how the photos or videos should be arranged. Likewise, the template-creation request could include instructions that dictate which user accounts will be allowed to submit photos or videos for the newly created mosaic template. Once the template-creation request is received, the sub-process continues by generating a new mosaic template in accordance to the template-creation request with the remote server. The new mosaic template is a mosaic template that is used to implement the instructions that were included in the template-creation request. Additionally, the new mosaic template uses the supplied image as the base image that will be used to generate the interactive mosaic. The sub-process concludes by appending the new mosaic template to the at least one mosaic template with the remote server. Thus appended, each user account is able to select the new mosaic template as the desired template when submitting personalized messages.

Figure 4:
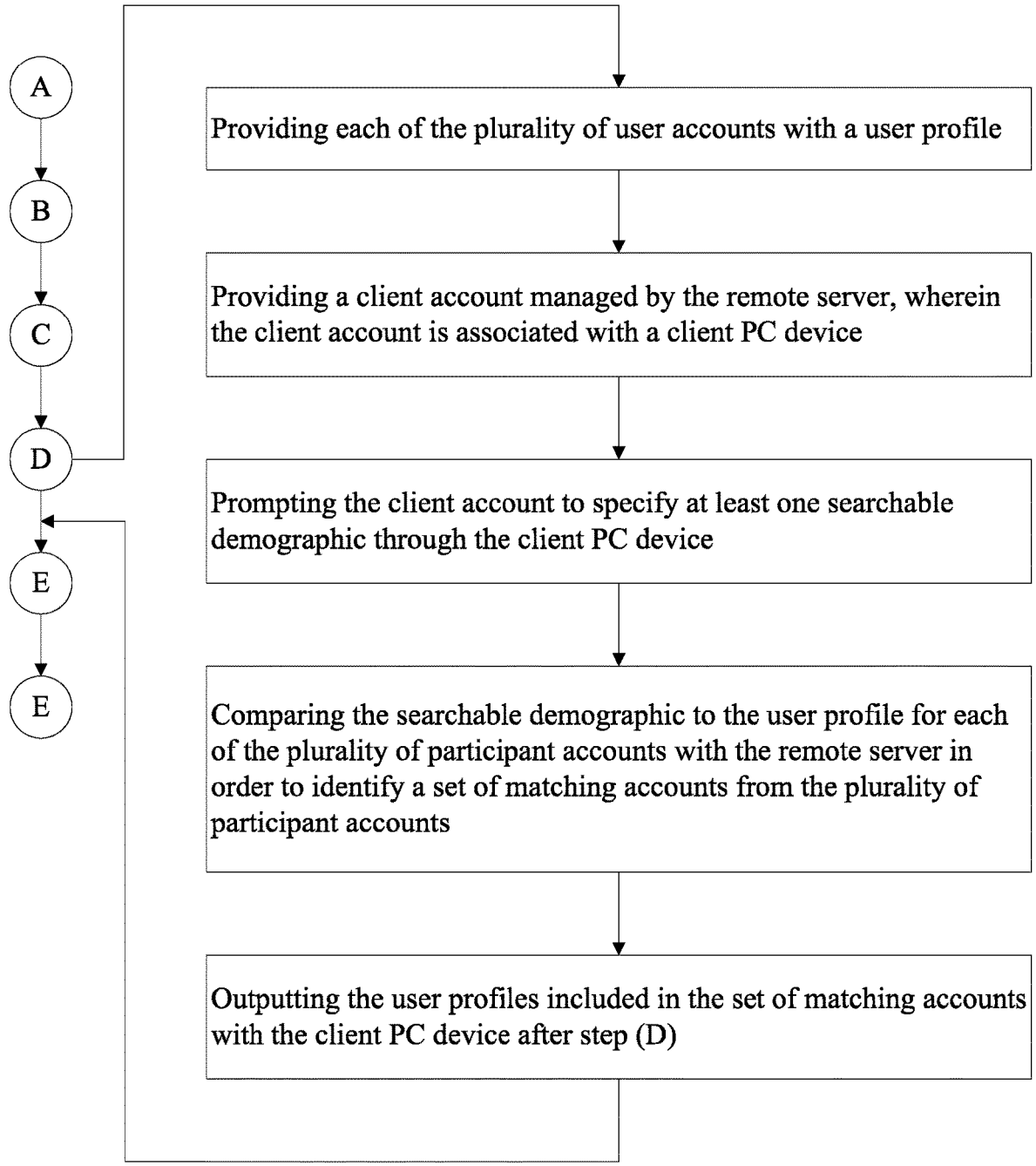
FIG. 4 is a flowchart describing a process for performing data mining operations through the method of the present invention.

As can be seen in FIG. 4, as described above, the method of the present invention is designed with a sub-process that enables the business client to mine the data provided by the customers for useful information regarding customer engagement. To accomplish this, the system used to execute the method of the present invention provides each of the plurality of user accounts with a user profile. The user profile is a record of personal and demographic data that is associated with each customer who has a user account. The sub-process begins by prompting the client account to specify at least one searchable demographic through the client PC device. The searchable demographic is a query that the business client would like to have answered. The business client is prompted to enter questions or criteria that will be used to identify a group of the participant accounts whose user profiles contain information that satisfies the question or criteria. To accomplish this, the sub-process continues by comparing the searchable demographic to the user profile for each of the plurality of participant accounts with the remote server in order to identify a set of matching accounts from the plurality of participant accounts. The set of matching accounts is the collection of user accounts that have user profiles which include a reference to the searchable demographic. For example, the business client may enter "males under the age of 25 who live in Denver, Colo." as the searchable demographic. The sub-process would then compare the searchable demographic to the user profiles of each participant account. The sub-process would then include the user accounts of every participant account that is associated with a male under the age of 25 who lives in Denver, Colo. within the set of matching accounts. The sub-process concludes by outputting the user profiles included in the set of matching accounts with the client PC device after Step D. The business client is then able to sift through the supplied data to perform any analytics that are required.

Figure 5:
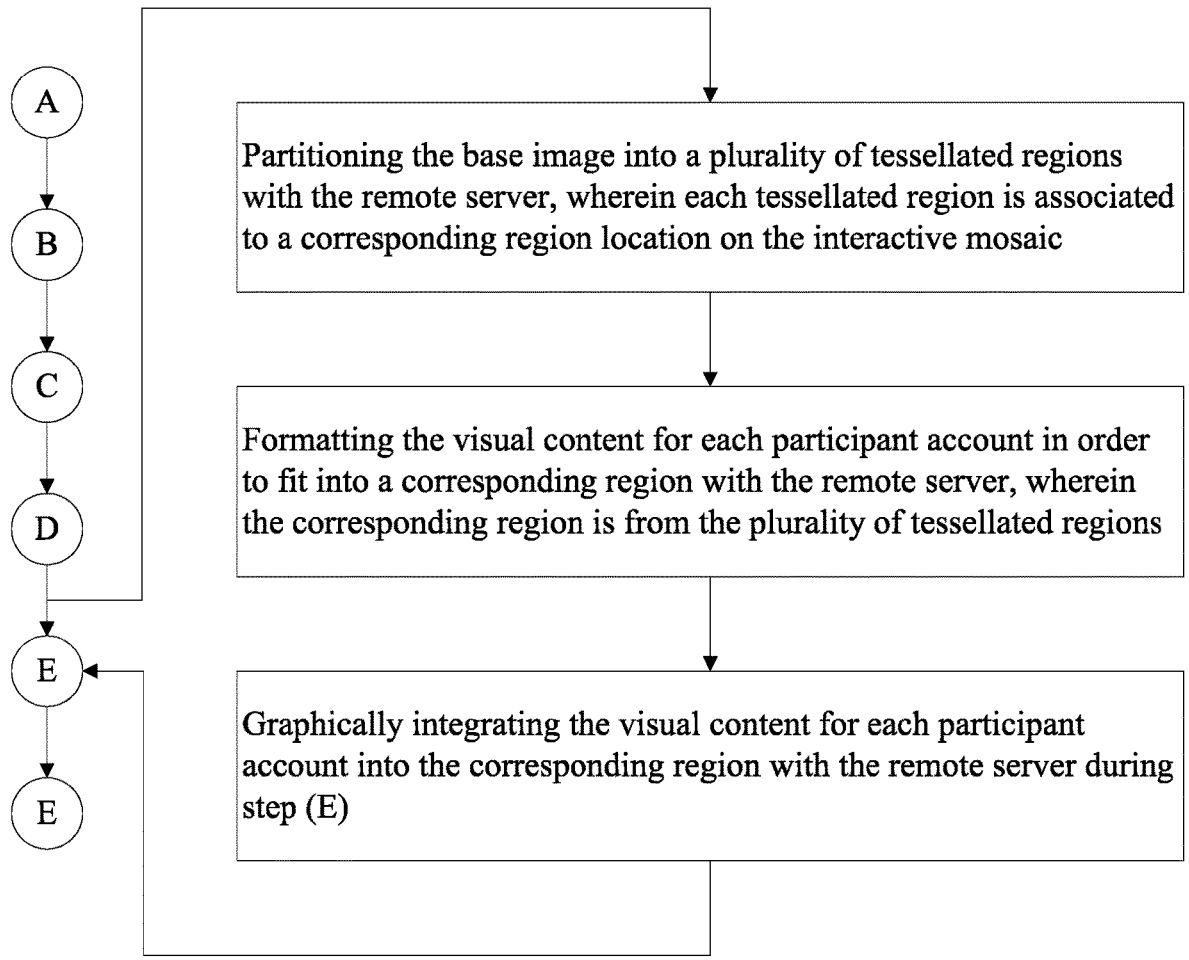
FIG. 5 is a flowchart describing a process for generating the interactive mosaic through the method of the present invention.

As can be seen in FIG. 5, the routine of generating the interactive mosaic is accomplished by performing a sub-process that formats and then organizes the photos and videos that were submitted by customers. Specifically, the sub-process for generating the interactive mosaic begins by partitioning the base image into a plurality of tessellated regions with the remote server. Each of the tessellated region is a distinct section of the base image. Additionally, each tessellated region is associated to a corresponding region location on the interactive mosaic. Accordingly, the base image is subdivided into a collection of contiguous regions that forms the framework of the interactive mosaic. Furthermore, each of these contiguous regions is assigned a specific location identifier that is used to distinguish the location of one region from the location of all others. The base image is divided to accommodate the number of photos and videos that were submitted by the customers. That is, the number of tessellated regions is calculated such that the visual content which was included in each personalized message will be associated with a unique corresponding region. Alternatively, the business client is able to specify what visual content and how many photos or videos will be integrated into the interactive mosaic. The business client specifies which visual content, and how many photos or videos will be integrated into the interactive mosaic when sending the mosaic-creation request.

As can be seen in FIG. 5, once the base image has been partitioned, the sub-process is ready to prepare the submitted photos and videos to be integrated into a mosaic. Consequently, the sub-process continues by formatting the visual content for each participant account in order to fit into a corresponding region with the remote server. The corresponding region is a unique region from the plurality of tessellated regions. As such, the sub-process of the method of the present modifies the visual content submitted by each participant account so that the visual content is positioned into an appropriate section of the base image. The formatting process involves image manipulation techniques including, but not limited to, modifying image size, shape, and color. For example, if a region of the base image is initially red in color, then the formatting process may involve changing the color of the visual content to be cast in a red hue. Alternatively, the image formatting process may simply involve cropping the visual content's dimensions to correspond to the dimensions of the corresponding region. The sub-process continues by graphically integrating the visual content for each participant account into the corresponding region with the remote server during Step E. The final step in this sub-process combines the formatted visual content with the tessellated regions of the base image to create a mosaic that contains each piece of formatted visual content. The mosaic is interactive in that each tessellated region includes a unique photo or video that can be expanded, highlighted, and shared.

Figure 6:
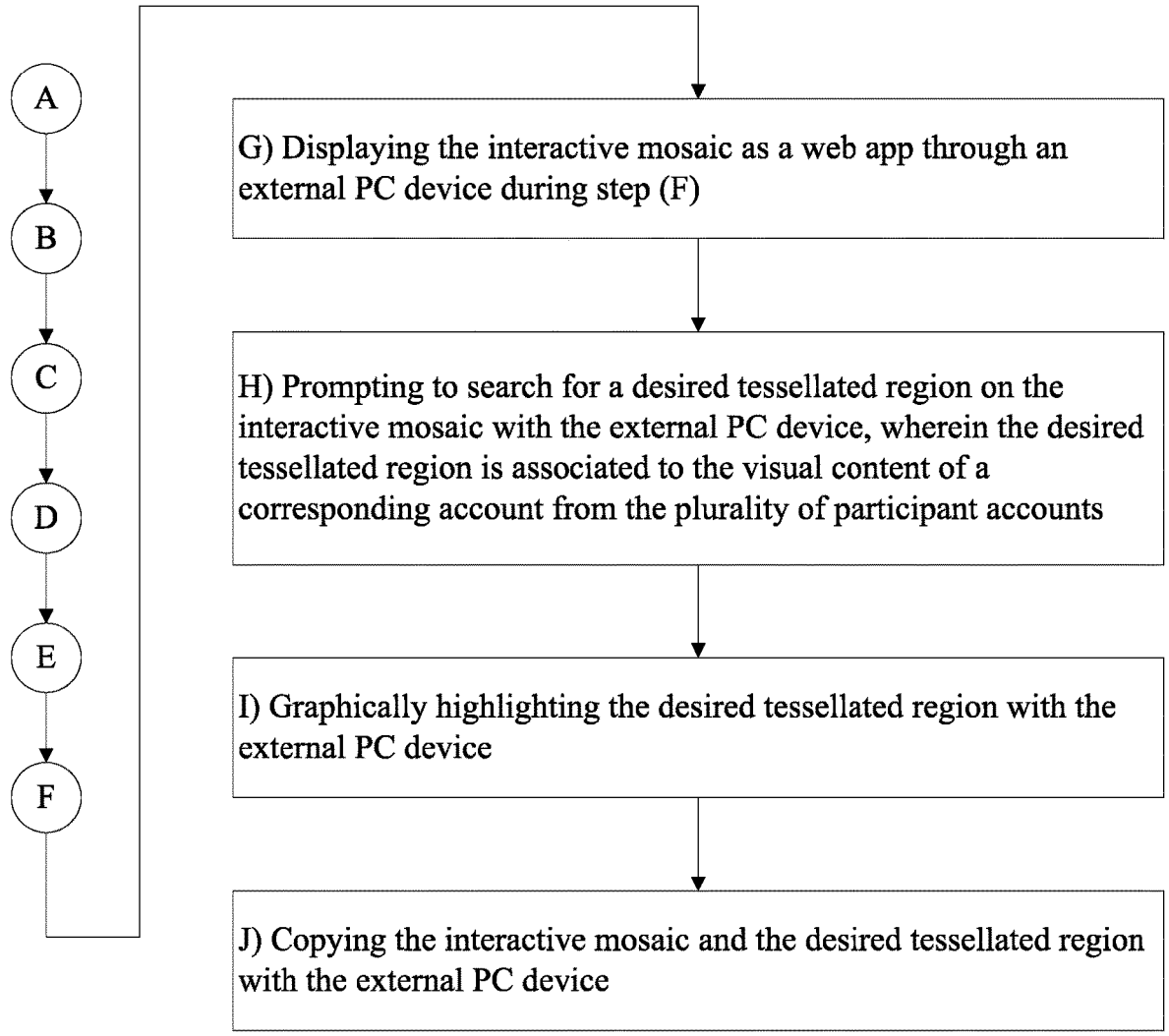
FIG. 6 is a flowchart describing a process for accessing and interacting with the interactive mosaic through the method of the present invention.

As can be seen in FIG. 6, as described above, the present invention enables individuals to use various PC devices to access the interactive mosaic once hosted on the remote server. To accomplish this, the present invention includes a sub-process that begins by displaying the interactive mosaic as a web app through an external PC device during Step F (Step G) The web app is hosted by the remote server and is used to enable multiple individuals, including various external users, to access and manipulate the interactive mosaic through disparate computing devices. As such, the external PC device is a computing device such as a PC, mobile phone, or tablet that can be used to display and manipulate the interactive mosaic. In addition to functioning as a web app, the interactive display can be integrated into a native app which can be accessed without the use of a web browser. The sub-process continues by prompting to search for a desired tessellated region on the interactive mosaic with the external PC device (Step H). The sub-process enables individuals who access the web app to search for specific photos and videos that are integrated into the interactive mosaic. Specifically, the desired tessellated region is associated to the visual content of a corresponding account from the plurality of participant accounts. Therefore, individuals who access the web app are given the choice to simply browse through the photos and videos that make up the interactive mosaic, or to search for a specific photo or video. The sub-process continues by graphically highlighting the desired tessellated region with the external PC device (Step I). Graphically highlighting involves somehow differentiating the desired tessellated region from the remaining plurality of tessellated regions. For example, the sub-process may draw a distinctive border around the desired tessellated region. Alternatively, the sub-process may generate a pin or dialog box that asks the individual to enter the names of the people shown in the photo or video that is displayed within the desired tessellated region. The desired tessellated region may also be made larger than the surrounding plurality of tessellated regions as a form of graphical highlighting. The sub-process continues by copying the interactive mosaic and the desired tessellated region with the external PC device (Step J). Once an individual finds the photo or video that that was being searched for, the sub-process visually highlights the photo or video and copies the interactive mosaic onto the external PC device so that the individual is able to share the interactive mosaic with friends and family. When the interactive mosaic is copied, the external PC device makes a static duplication of the interactive mosaic that can no longer be searched through or manipulated. Alternatively, the sub-process may generate a weblink that can be copied and shared with friends and family. Rather than copying a static image of the interactive mosaic, the copied weblink will direct an external PC device to a version of the interactive mosaic where the desired tessellated region is highlighted.

Figure 7:
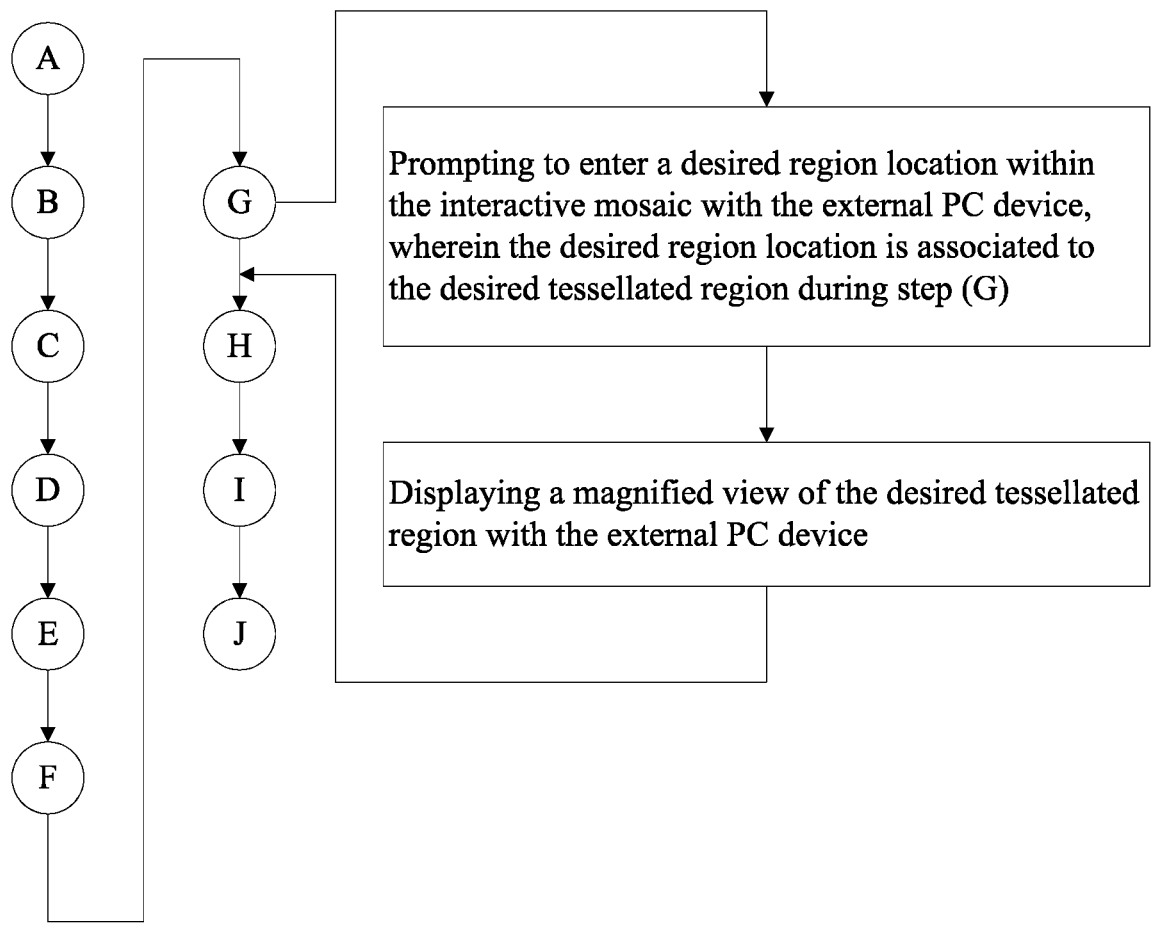
FIG. 7 is a flowchart describing a process for searching for a desired region in the interactive mosaic through the method of the present invention.
Figure 8:
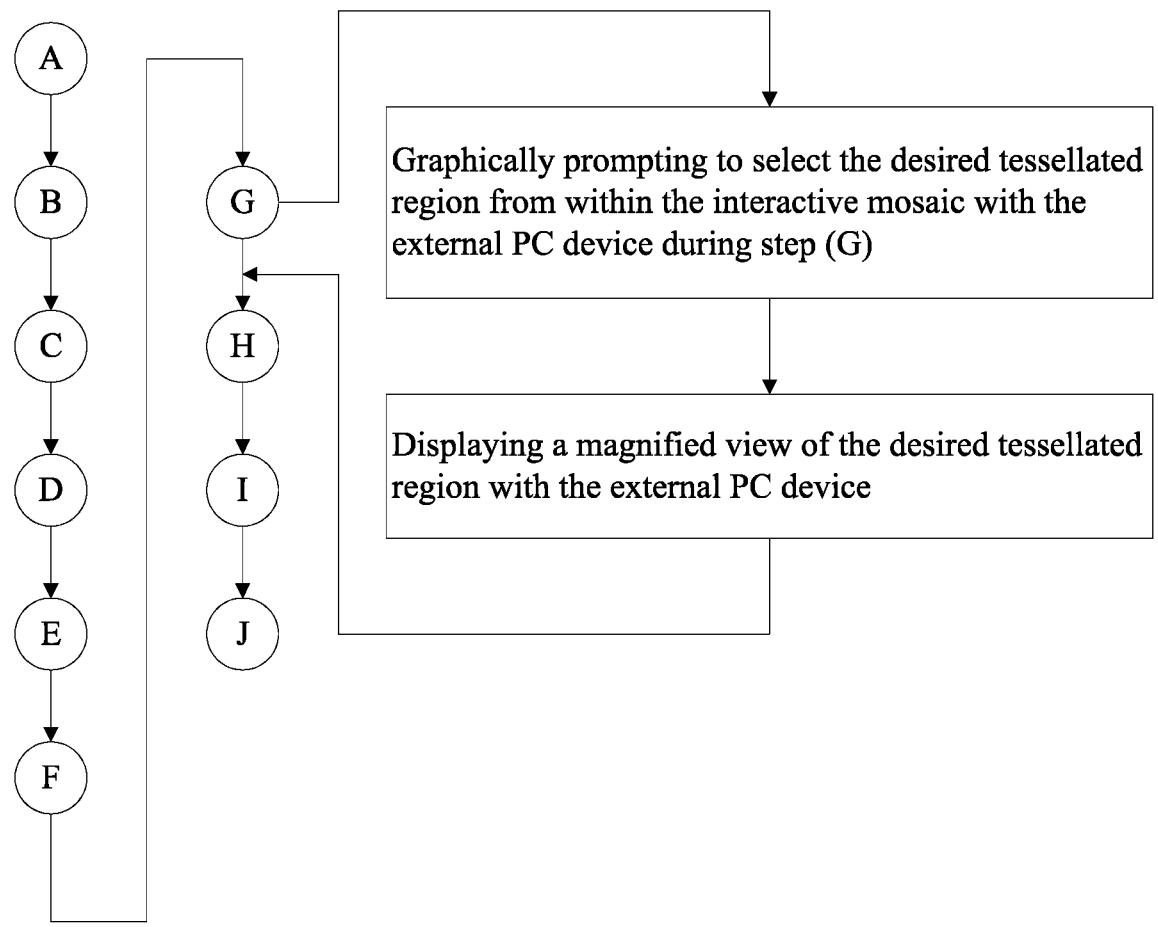
FIG. 8 is a flowchart describing a process for searching for a specific image or video in the interactive mosaic through the method of the present invention.

As can be seen in FIG. 7 and FIG. 8, the sub-process used to enable searching through, visually highlighting, and sharing the interactive mosaic makes use of sub-routines that enable the individual to employ different methods of searching a desired photo or video. A first mode of searching is enabled by a sub-routine that begins by prompting to enter a desired region location within the interactive mosaic with the external PC device during Step G. The desired region location is the coordinate designation for the desired tessellated region within the plurality of tessellated regions. As an example, when the plurality of tessellated images is arranged into a coordinate plane each tessellated region is located at a unique set of coordinates within the coordinate plane. In this example, the desired region location will be the set of coordinates that correspond to the location of the desired tessellated region. Once the desired region location is received, the sub-process continues by displaying a magnified view of the desired tessellated region with the external PC device. The interactive mosaic is updated to show an enlarged version of the photo or video that is contained within the desired tessellated region. The individual is then able to view, graphically, highlight, and share the interactive mosaic with the enlarged version of the photo or video that was searched for. A second mode of searching is enabled by a sub-routine that begins by graphically prompting to select the desired tessellated region from within the interactive mosaic with the external PC device during Step G. In this mode, the individual simply browses through the photos and videos that are integrated into the interactive mosaic. The individual is presented with the interactive mosaic, and then proceeds to zoom in on, and scroll across, various photos and videos until the individual finds the photo or video being searched for. Once the desired tessellated region is identified, the sub-routine continues by displaying a magnified view of the desired tessellated region with the external PC device. The interactive mosaic is updated to show an enlarged version of the photo or video that is contained within the desired tessellated region. The individual is then able to view, graphically, highlight, and share the interactive mosaic with the enlarged version of the photo or video that was searched for.

Figure 9:
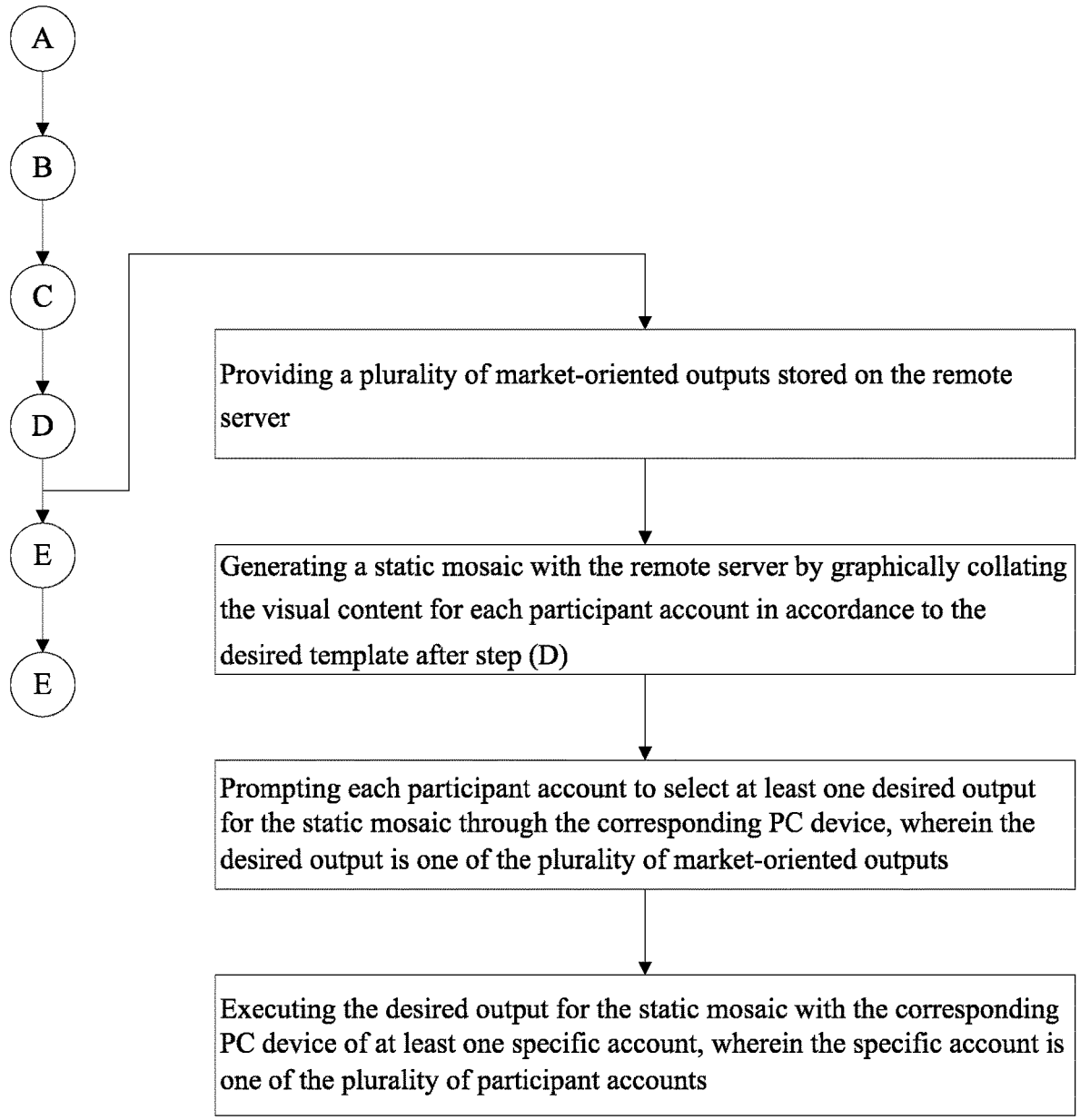
FIG. 9 is a flowchart describing a process for generating and outputting a static mosaic as a physical manifestation.

As can be seen FIG. 9, the sub-process used to generate an alternative outcome other than hosting the interactive mosaic requires a plurality of market-oriented outputs to be stored on the remote server. Each market-oriented output is a set of executable instructions for the remote server to physically manifest a static mosaic, which is primarily used as a product for sale at retail or marketing tool for the business client. For example, one market-oriented output could be a set of computer-executable instructions to physically print the static mosaic onto a product package, a shirt, a mug, or a banner as a piece of brand art for the business client. Similar to the interactive mosaic, the static mosaic is generated with the remote server after Step D by graphically collating the visual content for each participant account in accordance to the desired template. The static mosaic is an unalterable image that still contains the photos and videos that have been submitted by customers. These photos and videos are formatted and arranged to form a mosaiced version of the base image that was supplied by the business client. After the static mosaic is generated with the remote server, the sub-process continues by prompting each participant account to select at least one desired output for the static mosaic through the corresponding PC device. The desired output is selected from the plurality of market-oriented outputs that is stored on the remote server. The desired output for the static mosaic is then executed by the corresponding PC device of at least one specific account, which can be any of the plurality of participant accounts. Continuing with the aforementioned example, the corresponding PC device of the specific account would process and manage the instructions given in the desired output to two-dimensionally or three-dimensionally print the static mosaic onto a physical object, such as a product package, a shirt, a mug, or a banner.

Although the invention has been explained in relation to its preferred embodiment, it is to be understood that many other possible modifications and variations can be made without departing from the spirit and scope of the invention as hereinafter claimed.

What is claimed is:

1. A method for promoting and documenting customer engagement using an online photo-sharing platform, the method comprises the steps of:
    (A) providing at least one mosaic templates managed by at least one remote server, wherein each mosaic template includes a base image;
    (B) providing a plurality of user accounts managed by the remote server, wherein each user account is associated with a corresponding personal computing (PC) device;
    providing a client account managed by the remote server, wherein the client account is associated with a client PC device;
    receiving a template-creation request from the client account with the remote server, wherein the template-creation request includes a supplied image;
    generating a new mosaic template in accordance to the template-creation request with the remote server, wherein the supplied image is used as the base image for the new mosaic template; and
    appending the new mosaic template to the at least one mosaic template with the remote server;
    (C) prompting each user account to enter a personalized message for a desired template through the corresponding PC device, wherein the desired template is at least one of the at least one mosaic templates;

(D) receiving visual content as the personalized message from each of a plurality of participant accounts with the remote server, wherein the participant accounts is from the plurality of user accounts;

(E) generating an interactive mosaic with the remote server by graphically collating the visual content for each participant account in accordance to the desired template; and (F) hosting the interactive mosaic with the remote server.

2. The method for promoting and documenting customer engagement using an online photo-sharing platform, the method as claimed in claim 1 comprises the steps of:
providing each of the plurality of user accounts with a user profile;
providing a client account managed by the remote server, wherein the client account is associated with a client PC device;
prompting the client account to specify at least one searchable demographic through the client PC device;
comparing the searchable demographic to the user profile for each of the plurality of participant accounts with the remote server in order to identify a set of matching accounts from the plurality of participant accounts; and
outputting the user profiles included in the set of matching accounts with the client PC device after step (D).

3. The method for promoting and documenting customer engagement using an online photo-sharing platform, the method as claimed in claim 1 comprises the steps of:
partitioning the base image into a plurality of tessellated regions with the remote server, wherein each tessellated region is associated to a corresponding region location on the interactive mosaic;
formatting the visual content for each participant account in order to fit into a corresponding region with the remote server, wherein the corresponding region is from the plurality of tessellated regions; and
graphically integrating the visual content for each participant account into the corresponding region with the remote server during step (E).

4. The method for promoting and documenting customer engagement using an online photo-sharing platform, the method as claimed in claim 1 comprises the steps of:
(G) displaying the interactive mosaic as a web app through an external PC device during step (F);

(H) prompting to search for a desired tessellated region on the interactive mosaic with the external PC device, wherein the desired tessellated region is associated to the visual content of a corresponding account from the plurality of participant accounts;

(I) graphically highlighting the desired tessellated region with the external PC device; and (J) copying the interactive mosaic and the desired tessellated region with the external PC device.

5. The method for promoting and documenting customer engagement using an online photo-sharing platform, the method as claimed in claim 4 comprises the steps of:
prompting to enter a desired region location within the interactive mosaic with the external PC device, wherein the desired region location is associated to the desired tessellated region during step (G); and
displaying a magnified view of the desired tessellated region with the external PC device.

6. The method for promoting and documenting customer engagement using an online photo-sharing platform, the method as claimed in claim 4 comprises the steps of:
graphically prompting to select the desired tessellated region from within the interactive mosaic with the external PC device during step (G); and
displaying a magnified view of the desired tessellated region with the external PC device.

7. The method for promoting and documenting customer engagement using an online photo-sharing platform, the method as claimed in claim 1 comprises the steps of:
providing a plurality of market-oriented outputs stored on the remote server;
generating a static mosaic with the remote server by graphically collating the visual content for each participant account in accordance to the desired template after step (D);
prompting each participant account to select at least one desired output for the static mosaic through the corresponding PC device, wherein the desired output is one of the plurality of market-oriented outputs; and
executing the desired output for the static mosaic with the corresponding PC device of at least one specific account, wherein the specific account is one of the plurality of participant accounts.

* * * * *